United States Patent Office 3,385,986
Patented May 28, 1968

3,385,986
CONTROLLED-VELOCITY DRIVE
Aubrey H. Smith, Kenosha, Wis., assignor to Eaton Yale & Towne, Inc., Cleveland, Ohio, a corporation of Ohio
Continuation of application Ser. No. 374,784, June 12, 1964. This application Apr. 26, 1967, Ser. No. 642,991
7 Claims. (Cl. 310—95)

ABSTRACT OF THE DISCLOSURE

A solid-state speed control is disclosed in which the energization of the field winding of an eddy-current coupling is varied in response to the relative amplitudes of a reference signal and a feedback signal which varies as a function of the coupling output speed. The reference signal is provided by an adjustable source, which supplies a voltage analog of a preselected speed, and a low pass filter which damps changes in the voltages supplied by the source thereby to limit the rate of change of the output speed.

Cross-reference to related application

This application is a continuation of application Ser. No. 374,784, filed June 12, 1964.

Background of the invention

This invention relates to a controlled-velocity drive and more particularly to a solid-state switching control for an electromagnetic coupling device providing controlled acceleration and deceleration.

Summary of the invention

Among the several objects of this invention may be noted the provision of a solid-state switching control for an electromagnetic coupling device having improved speed regulation characteristics over a greatly extended speed range; the provision of a speed-control system which is critically damped so that optimum response to load changes is obtained while undesirable system oscillations are inherently resisted. Further objects include the provision of such a system in which the accelerations produced in changing to a newly desired angular velocity are controlled according to a time damped characteristic so that overshooting of the newly desired speed and system oscillations are prevented and so that the response of the system can be tailored to match or be compatible with other equipment with which the coupling may be employed. Still further objects are the provision of a control of the class described which has relatively low thermal and inherent drift characteristics; and the provision of a speed-control system which is relatively inexpensive, easily and inexpensively maintained, and which exhibits a high degree of reliability in operation. Other objects and features will be in part apparent and in part pointed out hereinafter.

Essentially the invention relates to a solid-state control circuit to be employed in a controlled-velocity drive involving a driven member, a winding the energization of which controls the speed of said driven member, and a solid-state switching device, for example, a silicon controlled rectifier, for selectively controlling the energization of this winding thereby to regulate the angular veloctiy of the driven member. The control comprises a feedback circuit including a tachometer for sensing the angular velocity of the driven member and producing a feedback signal which varies as a function thereof. An adjustable voltage source is employed to provide a voltage which is an analog of the desired or preselected angular velocity. A damping network or low pass filter is connected to the adjustable source to provide a reference signal which is, at any given instant, a damped function of the preceding voltage levels provided by the adjustable source. Accordingly, when the source is abruptly readjusted, the reference signal does not instantaneously rise to a voltage level which represents the new velocity. Rather, the reference signal approaches its new level gradually. The control further comprises transistor circuit means responsive to the relative levels of the reference signal and the feedback signal for selectively actuating the solid-state switching device to maintain the angular velocity of the driven member substantially equal to the preselected angular velocity as represented by the damped reference signal.

In accordance with the invention, the reference signal provided by the damping network is coupled to the transistor circuit means for selectively actuating the switching device through a high impedance input transistor amplifier, such as an emitter-follower amplifier, so that the time constant of the damping network is substantially unaffected by loading.

In one aspect of the invention, the damping network comprises a resistance-capacitance time integrating network whereby abrupt changes in the adjustment of the adjustable source, for example in response to a requirement for higher speed throughout a production process, will produce a reference signal which logarithmically approaches a new value. Since the control employs feedback to obtain a comparison between the actual speed and the desired speed as represented by the referenc signal, the angular velocity of the driven member will track the reference signal and accelerations of the driven member are correspondingly controlled.

In a particular aspect of the invention, different damping time constants are provided for positive and negative accelerations so that the system characteristics can be more flexibly tailored.

Brief description of the drawings

Corresponding reference characters indicate corresponding parts throughout the several views of the drawings.

Description of the preferred embodiment

Figure 1:
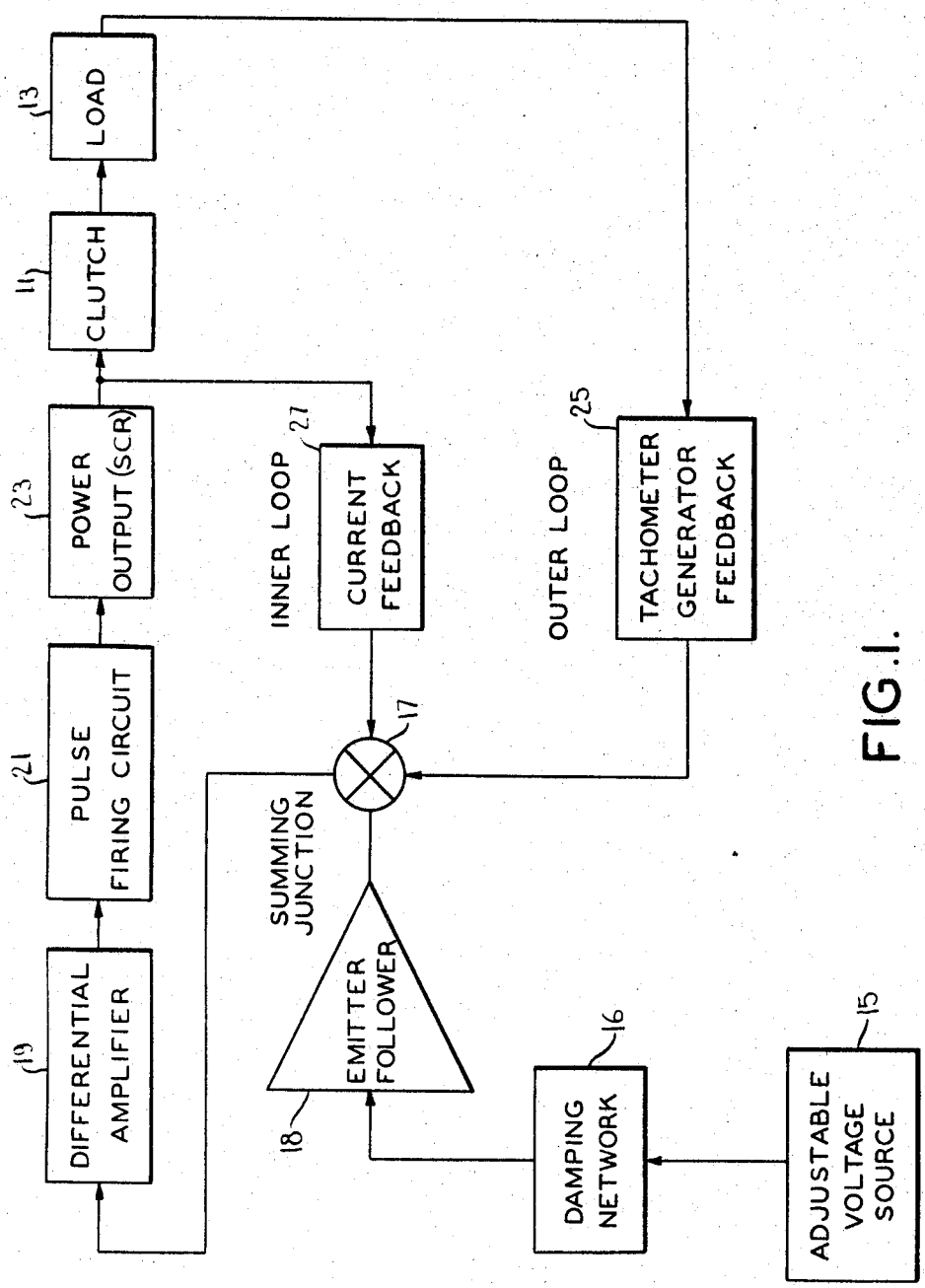
FIG. 1 is a block diagram of the interconnected major components of a controlled-velocity drive illustrating one of the embodiments of this invention.

Referring now to the drawings, and more particularly to FIG. 1, the present invention comprises a solid-state switching control 23 for selectively energizing the field or control winding of an electromagnetic slip coupling device, for example, an eddy-current clutch, or that of a D.C. motor. An eddy-current clutch is indicated by the block 11 in FIG. 1. It functions to couple power from a rotating driving member (not shown) to a load or driven member indicated at 13. The control serves to energize this clutch to maintain the angular velocity of the driven member equal, or substantially equal (for example, within 1% regulation), to a preselected or desired angular velocity. An adjustable voltage source 15 is provided to supply a voltage analog of this preselected angular velocity. The voltage from the source 15 is applied to a low pass filter or damping network 16 which provides a reference signal which is, at any given instant, a damped or time integrated function of the voltage levels provided previously by said source. This reference signal is applied through high impedance input emitter-follower amplifier 18, to a summing junction indicated at 17, which, as may be understood with reference to FIG. 2, comprises a solder junction within the control circuit. The emitter-follower amplifier 18 prevents the summing junction 17, the various circuits connected thereto, from loading the damping network 16, which loading would otherwise distort its time integrating function. The outputs of two negative feedbacks loops disclosed hereinafter are also applied to junction 17. The composite output of this junction (i.e., the algebraic sum of the signals applied thereto) is in turn applied to the input of a differential amplifier 19 which serves to control the triggering of a pulse firing circuit 21. The latter controls the energization of the solid-state current control device 23, which may for example include a silicon controlled rectifier and which serves to control the energization of clutch 11 to maintain the speed of the driven member 13 equal to the preselected speed as represented by the damped reference signal.

A tachometer generator 25 is driven by the driven member to sense the angular velocity thereof. The output of this generator is applied as indicated to summing junction 17 to form a negative feedback circuit responsive to incipient variations in the speed of the driven member under control. As indicated in FIG. 1, this tachometer generator feedback forms an outer feedback loop. An inner feedback loop is provided by a current feedback control indicated at 27. This latter circuit responds to changes in the energization of current through the clutch coil 11 and acts to modify the power output accordingly. As explained hereinafter, this current feedback forms a high gain sensitivity feedback loop which lessens the response time of the control while insuring against undesirable system oscillations.

Figures 2, 2A:
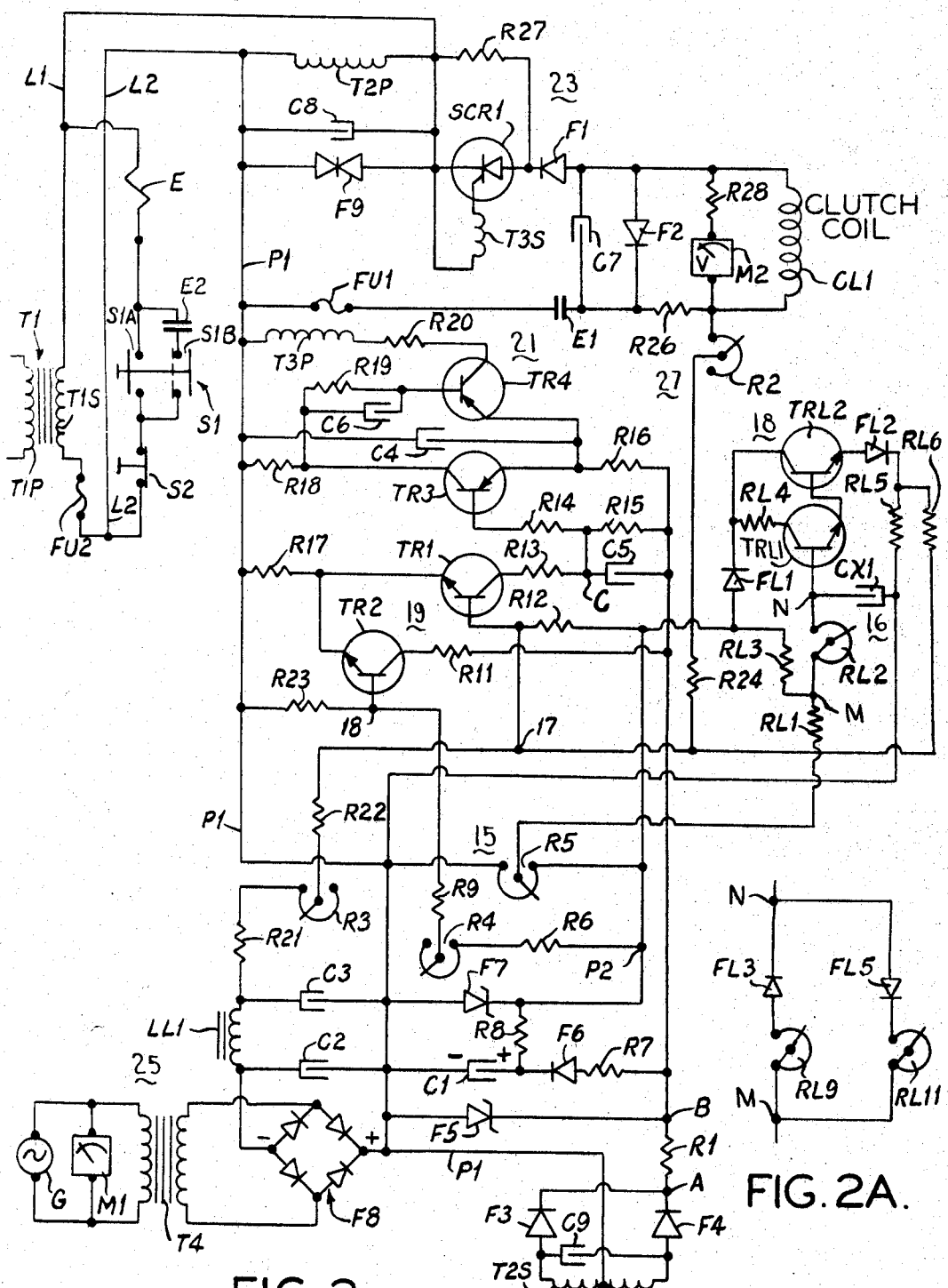
FIG. 2 is a schematic circuit diagram of the FIG. 1 system.
FIG. 2A is a schematic circuit diagram of a modification which can be made in the circuit of FIG. 2 to provide a second embodiment of this invention.

Referring now to FIG. 2 which illustrates the individual components which make up the FIG. 1 system and their interconnection, power for the control system is provided by a transformer T1 having a primary winding T1P and a secondary winding T1S. The former may be connected across a 220 v. or 440 v. A.C. source, for example, while the latter supplies A.C. power to the control circuit at 115 v. A.C. Connected across secondary winding T1S by a pair of conductors L1 and L2 and a fuse FU2 is the primary winding T2P of second transformer T2 which includes a center-tapped secondary winding T2S (shown at the bottom portion of the FIG. 2 schematic). A conventional "Jog-Run-Stop" control for the electromagnetic coupling device is provided by a jog-run switch S1 (having a first portion S1A and a second portion S1B), a stop switch S2, and a relay, the coil of which is indicated at E and the normally open contacts of which are shown at E1 and E2. To provide a momentary energization of the clutch winding (i.e., to provide a jog control) switch portion S1A is closed momentarily (contacts S1B remaining open) thereby energizing coil E and closing contacts E1 for a brief period. If the clutch is to remain energized (i.e., if a "run" operation is called for), both portions or contacts of switch S1 are closed. This not only energizes coil E, but also completes a holding circuit through contacts S1B and E2 to maintain coil E energized until stop switch S2 is opened.

A transformer T2 having a center-tapped secondary T2S and a pair of rectifying diodes F3 and F4 provide an unfiltered full-wave-rectified pulsating D.C. potential between a point or junction A and the center tap of secondary winding T2S. The latter is connected to a junction or bus P1 which forms the common bus of the circuit. A capacitor C9 is connected across winding T2S to provide a low impedance shunt to high frequency line transients. In addition to protecting diodes F3 and F4, this capacitor C9 serves to prevent misfiring of the pulse firing circuit described below. The wave form of the potential at point A with respect to point P1 is shown at A in FIG. 3.

A current limiting resistor R1 is connected in series with a Zener diode F5. The latter provides a clipping action thereby providing at point B a wave form as illustrated in FIG. 3B. The average D.C. potential of this FIG. 3B potential (again with respect to point P1) is +12 volts ±10%. The unfiltered potential appearing at point B is employed to provide power to the differential amplifier and the pulse firing circuit both described hereinafter. Because Zener diode F5 is not temperature compensated, the average D.C. potential at point B may vary with temperature.

A temperature compensated reference and bias supply portion of the circuit is interconnected with point B by a current limiting resistor R7 and an isolating or blocking diode F6. A filtering or smoothing capacitor C1 is connected between the cathode of diode F6 and point P1. The potential across this capacitor may be, for example, on the order of 11.5 v. D.C. Diode F6 prevents this potential from being applied to the differential amplifier or pulsing circuit. Connected across capacitor C1 is a regulating resistor R8 connected in series with a temperature compensated Zener diode F7. This series circuit provides a temperature compensated continuous D.C. potential between a point P2 and junction P1. This reference potential may have a value, for example, of from +8.55 v. to +9.45 v.

A rheostat or variable resistance R4 and a pair of fixed resistances R6 and R9 are connected in series between point P2 and a junction indicated at reference numeral 18. As will be apparent hereinafter, the setting of variable resistance R4 determines the minimum current through the clutch coil when the control is set for zero run speed.

The tachometer feedback portion of the FIG. 2 control includes an A.C. generator or tachometer G mounted on the output shaft of the eddy-current coupling device. This generator has a voltage and frequency output which varies as a function of, or is proportional to, the output shaft velocity. A meter M1 is connected across the output of generator G to provide an indication of this output. Generator G feeds an isolation transformer T4 and a full-wave bridge type rectifier indicated at F8. The output of rectifier F8 is filtered by a smoothing network or circuit consisting of a pair of capacitors C2 and C3 and a choke coil LL1. The latter is a swinging choke effective only at very low frequencies and currents. The rectified and filtered output of feedback generator G is applied through a pair of fixed resistors R21 and R22 series connected with a rheostat R3 to summing junction 17.

Variable resistance R3 constitutes a control the setting of which determines the maximum speed of the driven member or load. The proper adjustment for resistance R3 is made with the run speed potentiometer R5 set at its maximum speed setting under rated load conditions. Rheostat R3 is then adjusted so that the output of the coupling is rotated at the nameplate maximum rated output speed.

A potentiometer R5 is connected across points P1 and P2 so that the substantially constant voltage appearing across these points may be divided in any desired ratio by adjusting the position of movable arm of the potentiometer. The constant voltage power supply and the potentiometer R5 thus provide an adjustable voltage source 15 at the movable arm of the potentiometer. Potentiometer R5 may be set to represent any desired or preselected angular velocity of the driven member and provides at its movable arm a voltage which is an analog of this preselected velocity.

The voltage provided by the source 15 is applied through resistor RL1 to a low pass filter or damping network 16 which includes variable resistor RL2, connected between terminals M and N, and capacitor CX1 so as to obtain a damped or time integrated reference signal at the junction N between RL2 and CX1.

The reference signal is applied, through an emitter-follower amplifier 18, to the summing junction 17. The emitter-follower amplifier 18 employs two transistors TRL1 and TRL2 which are connected as cascade emitter followers so that the voltage gain is approximately unity. Resistors RL1 and RL3 provide a threshold bias network for the amplifier. These resistors, of course, also somewhat affect the damping network 16, but this effect is predictable and not harmful. Diode FL1 is a blocking diode that prevents capacitor CX1 from discharging through the base-collector junction of TRL1 and terminal P2 to ground. Resistor RL4 biases the second transistor TRL2, and resistor RL5 is its emitter load. Diode FL2 in series with the emitter load resistor RL5 provides temperature compensation that minimizes any temperature-induced output voltage changes.

The emitter-follower circuit 18 provides a high impedance input so that the damping circuit 16 is not loaded by the summing junction, which loading would otherwise distort the time integrating function of this circuit or would require the use of a capacitor of an impractically large value. Thus, in one sense, the amplifier 18 functions as an effective capacitance multiplier.

The reference signal, available at low impedance from the emitter circuit of transistor TRL2, is applied, through isolating resistor RL6, to the summing junction 17.

It will be appreciated that because the refernece sginal, derived from the potential appearing at the movable arm of potentiometer R5, has a polarity which is opposite to the polarity of the tachometer feedback signal appearing at the arm of rheostat R3 (the former being positive with respect to point P1 and the latter being negative with respect thereto), the currents applied to summing junction 17 have opposite signs, i.e., the current from the reference potentiometer flows into this point whereas current flows from the summing junction through resistor R2. Thus, in one sense the feedback and reference signals are compared at the summing junction 17. Current also flows from this junction through a resistor R24 which, as explained hereinafter, constitutes a portion of the inner or current feedback loop. The algebraic sum of these various currents is applied to the control electrode or base of a transistor TR1 which constitutes one of the transistors of the differential amplifier portion of the control. The other transistor of this amplifier is indicated at TR2.

A common emitter resistor R17 is interconnected between the emitters of transistors TR1 and TR2 and point P1, and a pair of matched load resistors R11 and R13 are connected to the respective collectors of these transistors. Resistor R11 is connected directly to point B while resistor R13 is connected to one terminal of a capacitor C5, the other terminal of which is connected to junction B. A current limiting resistor R12 connects the base of transistor TR1 with terminal P2. A similar resistor R23 connects the base of transistor TR2 with terminal or junction P1. The common connection between elements R13 and C5, point or junction C, constitutes the output terminal of the differential amplifier. The wave form of the potential appearing at the point C is illustrated in FIG. 3C. This potential, as explained hereinafter, controls the triggering or toggling of the pulse firing circuit, the latter in turn controlling the actuation of the solid-state switching device.

The pulse firing circuit consists of a modified Schmitt trigger circuit consisting of a pair of transistors TR3 and TR4, a common emitter resistor R16, and a pair of matched load resistors R18 and R20. A coupling network consisting of a resistor R19 and a shunt-connected capacitor C6 interconnects the collector of transistor TR3 with the base of transistor TR4. A filtering capacitor C4 is provided between common emitter resistor R16 and point P1 to maintain the threshold level of the Schmitt trigger circuit substantially constant regardless of transients in the system. The output of the differential amplifier appearing at point C is coupled through a current limiting resistor R14 to the base of transistor TR3. The common connection between resistor R14 and capacitor C5 is connected to point B by a resistor R15.

The output of the pulse firing circuit is coupled by an isolating pulse transformer to the gate electrode of a silicon controlled rectifier SCR1, the latter constituting the solid-state switching device mentioned above. The SCR1 and its associated components make up the current control or power output portion of the control. The primary of the pulse transformer, indicated at T3P, is connected in the output circuit of the modified Schmitt trigger, between load resistor R20 and point P1. The secondary winding T3S of this transformer is connected between the gate or control electrode of SCR1 and its cathode.

The field or control winding of the electromagnetic clutch or coupling device under control is indicated at CL1. This coil is connected in series with a fuse FU1, contacts E1, a resistor R26, a diode F1, and the anode-cathode circuit of SCR1, and the resulting series loop is connected across lines L1 and L2. A back rectifier F2 connected across coil CL1 shorts out off-cycle transients in the coil, making the latter appear, for all practical purposes, to be a resistive load. Diode F1 and a resistor R27 are secondary protective devices which serve to protect the controlled rectifier SCR1 from high PIV's and also to prevent misfiring thereof from high transient voltages. Transient suppression capacitors C7 and C8 are connected respectively across clutch coil CL1 and secondary winding T2P to provide low impedance paths for high frequency transients appearing in the circuit. A surge resistor indicated at F9 is connected across winding T2P to protect the circuit from low frequency line transients.

A voltmeter M2 in series with a resistor R28 is connected across coil CL1 to provide a continuous indication of the degree of energization or excitation thereof.

The current feedback portion of the control which senses the current through coil CL1 is illustrated as comprising a resistor R26 and a series circuit consisting of a rheostat R2 and resistance R24. Resistor R26 is in series with the clutch coil, and hence the potential across this resistor is proportional to or a function of the current through the coil. This potential is fed to the positive summing junction 17 by the variable resistance network consisting of rheostat R2 and resistor R24.

Initial operation of the FIG. 2 control is as follows:

The low bias rheostat R4 is initially adjusted to establish a minimum current level through the clutch coil when the run speed potentiometer R5 is set at zero. It has been established that in a typical case rheostat R4 should be adjusted to provide for 5% excitation of the clutch coil when the run speed potentiometer is set at zero. This setting produces optimum thermal drift characteristics.

The run speed potentiometer R5 is then adjusted or set to the desired angular velocity of the driven member. A properly calibrated knob or dial, for example, could be provided to facilitate this adjustment. Switch S1 is then actuated to its "run" position. As explained above, this latter action completes a circuit which energizes relay coil E thereby causing normally open contacts E1 and E2 to close. The closing of contacts E2 establishes a holding circuit for coil E, while the actuation of contacts E1 connects the series circuit including the clutch coil CL1 and SCR1 across lines L1 and L2. Thereafter, the degree of energization of the clutch coil depends upon the selective actuation of SCR1, or more particularly, the period or length of time during which this SCR1 is rendered conductive during a cycle of the A.C. appearing across L1 and L2. It will be appreciated that because of the polarity of diode F1 and SCR1, coil CL1 can only be energized during the negative half-cycles of this A.C. potential.

The particular setting of potentiometer R5 causes a positive potential, which is a voltage analog of the desired speed, to be coupled through the damping network 16 and the emitter-follower amplifier 18 to the summing junction 17 at the base of transistor TR1. Since the emitter-collector circuit of this transistor is series-connected with capacitor C5, the conductivity of this transistor controls the charging rate of this capacitor. Stated somewhat differently, capacitor C5, resistor R13, the emitter-collector circuit of TR1, and resistance R17 constitute an RC circuit, the R of which is controlled by the base-emitter potential of transistor TR1. Thus, increasing the positive potential at summing junction 17 causes capacitor C5 to charge at a more rapid rate.

Since the potential across a capacitor cannot change instantaneously, the potential at point C builds up concurrently with the leading edge of a pulse at point B. Initially, i.e., in the quiescent state, transistor TR4 of the modified Schmitt trigger circuit is conducting and transistor TR3 cut off. As the potential at point C builds up to exceed the threshold level of the Schmitt trigger (assumed for purposes of explanation to be 10 volts), transistor TR3 is triggered into conduction. Periods of conduction of TR3 are shown in FIG. 3D. Concurrently, transistor TR4 is cut off or rendered nonconducting. This causes a negative-going pulse (shown in FIG. 3E) to be coupled through secondary winding T3S to the gate of SCR1, thereby insuring that the SCR is in its off or nonconducting state during periods of conduction of transistor TR3.

The charging of capacitor C5 causes the potential at point C to decrease at a rate proportional to the charging rate of the capacitor. This decreasing potential is indicated at C' in FIG. 3C, the downward slope of this portion being a function of the conductivity of transistor TR1. Transistor TR3 remains conducting until the portion C' reaches the 10-volt trigger level of the Schmitt circuit, at which time transistor TR3 is cut off. This causes conduction of transistor TR4 which in turn causes a positive pulse spike to be coupled to the gate or control electrode of SCR1. Assuming proper polarity of the A.C. potential across L1 and L2, this spike causes conduction of SCR1 and concurrent energization of coil CL1. The pulse applied to this coil is shown in FIG. 3F, it being assumed that during the first half-cycle of the FIG. 3 wave forms line L1 is negative with respect to line L2.

It will be apparent that the duration of the pulse shown in FIG. 3F (and hence the degree of energization of the coil CL1) is dependent solely on the charging rate of capacitor C5. This charging rate is in turn dependent upon the potential at junction 17.

Figure 3:
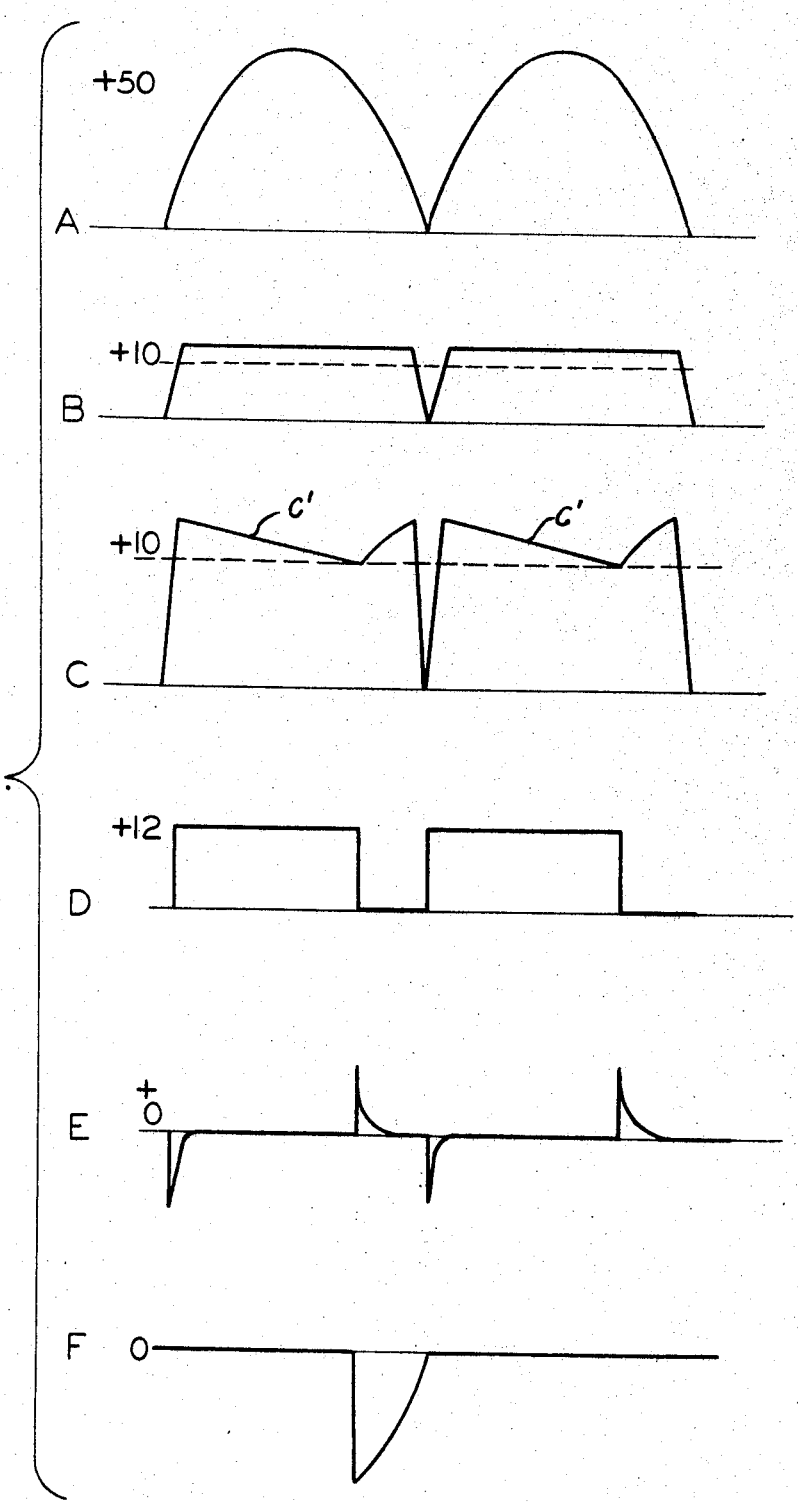
FIG. 3 illustrates various wave forms useful in explaining the operation of the embodiments of this invention.

During the subsequent half-cycle of the FIG. 3 wave forms the same control functions take place, i.e., the pulse firing circuit again triggers the gate of SCR1; however, a pulse is not applied to the clutch coil since line L1 is positive with respect to line L2. It will be understood that if a pair of SCR's are interconnected with coil CL1 to form a full-wave configuration (as opposed to the half-wave arrangement illustrated in FIG. 2), a pulse having a controlled duration would be applied to coil CL1 during each half-cycle of the A.C. applied to lines L1 and L2.

Energization of coil CL1 couples the driving member (for example a motor) with the rotatable driven member or load 13. The angular velocity of the driven member depends for the most part on the degree of energization of coil CL1. To sense this angularly velocity and feed back a control signal proportional thereto, tachometer generator G is, as mentioned above, mounted on the output shaft of the coupling device. Immediately after initial energization of coil CL1, the output of the generator feedback (coupled through resistor R2 to point 17) is at a very low value. Consequently, the positive potential at summing junction 17 is at a relatively high value. This increases the conductivity of transistor TR1, causes capacitor C5 to be charged at a rapid rate, and thereby increases the power supplied to the clutch coil through SCR1. This increases the coupling between the driving and driven members, increasing the speed of the latter. The resulting increase in speed is sensed by generator G which provides an increasingly negative voltage to point 17, for comparison with the positive reference signal. As the algebraic sum of the currents applied to point 17 becomes more negative, the base-emitter bias on transistor TR1 is reduced thereby also reducing the charging rate of capacitor C5. This in turn reduces the time during which SCR1 is conductive and thus reduces the degree of energization of coil CL1.

When the speed of the driven member reaches the preset level, the current supplied to coil CL1 is sufficient merely to maintain this desired speed. Excursions in the actual speed of the load above or below the desired speed are sensed by the tachometer feedback, and the power to coil CL1 is either increased or decreased, whichever action is necessary to bring the actual speed back to the desired level.

To provide a tighter speed control, i.e., to maintain the speed of the driven member more nearly equal to the preset speed, and to decrease the response time of the system, an inner feedback loop senses the current through the clutch coil CL1 and applies a negative feedback signal to point 17 proportional to this current. This inner loop consists of resistor R26 and series resistors R2 and R24. Once the desired speed has been attained, incipient variations in the current through coil CL1 are reflected back to the summing junction 17 in the form of a degenerative feedback. This degenerative feedback requires a somewhat higher overall gain for the system; however, depending on the setting of rheostat R2, the response time can be considerably reduced, for example, by a factor of 10. And since this response time can be reduced synthetically, a system which would be unstable can be made to be stable. For example, if the closed loop is unstable with a total response time T equal to .3 second, reducing this response time synthetically to a value of .03 second assures that the system will be stable. This not only insures against system oscillations, but also permits the design of a system which is critically damped.

To reduce thermal drift in the speed regulation caused by varying ambient temperature conditions, a differential amplifier configuration is provided to control the charging rate of capacitor C5. The beta gain of a transistor, i.e. the D.C. bias gain, varies considerably as a function of temperature. As temperature increases, the base-emitter resistance of a transistor decreases, and if a fixed base-emitter bias is applied, this decrease in resistance brings about an increase in the base-emitter current. This in turn causes an appreciable decrease in the collector-emitter resistance. Thus, if transistor TR1 alone were provided to control the charging rate of capacitor C5, this charging rate would vary as a result of temperature variations. Transistor TR2, however, in effect operates as a temperature compensating transducer which maintains the conductivity of transistor TR1 substantially independent of temperature changes.

Transistors TR1 and TR2 are preferably mounted in a common heatsink, physically coupled together so that the two transistor cases are at substantially the same temperature. Thus an increase in the temperature of TR1 (causing an increase in the conductivity thereof) is accompanied by a corresponding increase in the temperature of TR2. This increases the conductivity of the collector-emitter circuit of TR2 causing in turn an increase in the current through common emitter resistor R17. The increased current through R17 raises the positive potential at the emitter of transistor TR1, thereby altering the base-emitter bias of this transistor TR1. If the two transistors are selected to have approximately equal gains, the variation in the base-emitter bias of transistor TR1 just compensates for the temperature-induced bias-emitter resistance variation. This insures that the base-emitter current of TR1 (the parameter which controls the conductivity of the collector-emitter circuit thereof) remains substantially independent of temperature changes.

In one specific application of the FIG. 2 control, the speed regulation was within ±1% over a controlled speed range of 33 to 1. This is to be compared with prior-art systems wherein a good value of speed regulation is ±2% over a 10 to 1 speed range. The damping factor was somewhat greater than .7 and approached the optimum factor of .707; the thermal drift was less than .02% per ° F; and the inherent drift (i.e. changes in speed caused, for example, by diode commutations, transistor shot noises, SCR commutations, damped oscillations from the LC network, etc.) was less than ± one r.p.m. at all operating speeds within the speed range.

To control accelerations when the speed control potentiometer R5 is adjusted during operation, the voltage available at the movable arm is applied, in accordance with this invention, to the summing junction 17 through the damping network 16 rather than directly. When potentiometer R5 is turned abruptly to a new setting, the reference signal, available at the junction N between the resistor RL2 and the capacitor CX1, does not follow the adjustment simultaneously. Rather, as will be apparent to those skilled in the art, the signal voltage approaches its new value in a logarithmic fashion. In other words, the reference signal is, at any given instant, a damped function of the preceding voltage levels provided by the source 15. The values of CX1 and RL2 are chosen so that the time constant of the network can be varied over a convenient range, for example from 6 seconds to 100 seconds by the adjustment of RL2.

Since the summing junction 17 is associated with transistor circuitry, and more particularly is the base terminal of the transistor TR1, it necessarily functions at a low impedance level. Direct connection to such a low impedance circuit would load the damping network 16 and distort its time integrating characteristic. Accordingly, to prevent the summing junction 17 and the circuitry associated therewith from loading the damping network, the reference signal output of the network is applied to junction 17 through an emitter-follower amplifier 18 rather than directly. The amplifier 18 exhibits a relatively high input impedance and has a relatively low output impedance.

As the damped reference signal is applied to the summing junction 17 in undistorted form, the feedback control described hereinbefore will cause the angular velocity of the driven member to accurately track the reference signal. In other words, if the speed control potentiometer is abruptly shifted to a new setting, the control system will not cause the clutch 11 to attempt to achieve this new speed simultaneously with the adjustment. Rather, the driven member will approach its new speed in a logarithmic fashion in response to the damped character of the reference signal with which the feedback signal is compared. In this way overloading of the coupling may be avoided. The logarithmic approach is, of course, also advantageous in many situations to prevent oscillations and overshooting in systems with which the present control may be associated. The time constant of the logarithmic approach is, of course, determined largely by the relative values of rheostat RL2 and capacitor CX1 and can be easily adjusted to suit a particular situation by varying the effective value of RL2.

By employing the circuit shown in FIG. 2A between the terminals M and N in place of the single rheostat RL2 shown in FIG. 2, different rates may be given to positive and negative accelerations. In this modification a pair of rheostats RL9 and RL11 are provided, each having an associated, serially connected steering diode FL3 and FL5, respectively. The diodes are oppositely polarized so that when one is conducting the other is reverse biased. Accordingly, when positive acceleration is called for and current must flow into the capacitor CX1 to raise the potential of the reference signal, the diode FL5 will block and the rheostat RL9 alone will determine the time constant of the logarithmic approach to the new speed. Conversely, when negative acceleration or deceleration is called for by a new setting of potentiometer R5 and current must flow out of the capacitor CX1, the diode FL3 will block and the setting of rheostat RL11 alone will determine the logarithmic time constant.

Either of these differently damped reference signals, when compared with the feedback signals at the summing junction 17, will cause the velocity of the driven member or load 13 to behave in a corresponding manner. In other words, the feedback control causes the angular velocity of the driven member to track the particular reference signal.

In view of the above, it will be seen that the several objects of the invention are achieved and other advantageous results attained.

As various changes could be made in the above constructions and circuits without departing from the scope of the invention, it is intended that all matter contained in the above description or shown in the accompanying drawings shall be interpreted as illustrative and not in a limting sense.

What is claimed is:

1. In a controlled-velocity drive having a driven member, a winding the energization of which controls the speed of said driven member and a solid-state current control device for controlling the energization of said winding thereby to regulate the angular velocity of said driven member; a control for said solid-state device comprising: a feedback circuit sensing the angular velocity of said driven member and producing a feedback signal which varies as a function thereof; an adjustable source for producing a voltage analog of a preselected angular velocity of said driven member; low pass filter means connected to said source, said low pass filter means comprising a resistance-capacitance time integrating network for providing a reference signal which is, at any given instant, a damped function of the preceding voltage levels provided by said source whereby an abrupt change in the voltage provided by said source produces a reference signal which logarithmically approaches a new value; means, responsive to said reference signal and to said feedback signal, for actuating said solid-state current control device to maintain the angular velocity of said driven member substantially equal to the preselected angular velocity as represented by said reference signal; and an emitter-follower transistor amplifier interposed between said resistance-capacitance network and said means for actuating said solid-state device to prevent affecting of the time constant of said network by loading whereby accelerations of said driven member in response to changes in the preselected angular velocity are controlled as a damped function of the setting of said adjustable source.

2. In a controlled-velocity drive having a driven member, a winding the energization of which controls the speed of said driven member and a solid-state current control device for controlling the energization of said winding thereby to regulate the angular velocity of said driven member; a control for said solid-state device comprising: a feedback circuit sensing the angular velocity of said driven member and producing a feedback signal which varies as a function thereof; an adjustable source for producing a voltage analog of a preselected angular velocity of said driven member; low pass filter means connected to said source for providing a reference signal which is, at any given instant, a damped function of the preceding voltage levels provided by said source, said low pass filter means comprising a resistance-capacitance network and diode switching means for selectively actuating alternate portions of said network whereby different time constants are provided for positive and negative changes in the voltage level provided by said source; and means, responsive to said reference signal and to said feedback signal, for actuating said solid-state current control device to maintain the angular velocity of said driven member substantially equal to the preselected angular velocity as represented by said reference signal whereby positive and negative accelerations of said driven member in response to changes in the preselected angular velocity are controlled as respective damped functions of the changes in the setting of said adjustable source.

3. In a controlled-velocity drive having a driven member, a winding the energization of which controls the speed of said driven member and a solid-state current control device for controlling the energization of said winding thereby to regulate the angular velocity of said driven member; a control for said solid-state device comprising: a feedback circuit sensing the angular velocity of said driven member and producing a feedback signal which varies as a function thereof; an adjustable source for producing a voltage analog of a preselected angular velocity of said driven member; low pass filter means connected to said source for providing a reference signal which is, at any given instant, a damped function of the preceding voltage levels provided by said source, said filter means comprising a capacitor, a pair of resistors for connecting said capacitor to said source, and a diode in series with each of said resistors, said diodes being oppositely polarized whereby one resistor is operative during positive changes in the voltage level provided by said source and the other resistor is operative during negative changes to determine the time constant of said filter; and means, responsive to said reference signal and to said feedback signal, for actuating said solid-state current control device to maintain the angular velocity of said driven member substantially equal to the preselected angular velocity as represented by said reference signal whereby positive and negative accelerations of said driven member in response to changes in the preselected angular velocity are controlled as respective damped functions of the changes in the setting of said adjustable source.

4. In a controlled-velocity drive having a driven member, an electromagnetic coupling provided with a control winding, and a solid-state switching device for selectively controlling the energization of said winding thereby to regulate the angular velocity of said driven member; a control for said switching device comprising: a feedback circuit sensing the angular velocity of said driven member and producing a feedback signal which varies as a function thereof; an adjustable source for producing a voltage analog of a preselected angular velocity of said driven member; a time integrating resistance-capacitance network connected across said source for providing a reference signal which is, at any given instant, a logarithmically damped function of the preceding voltage levels provided by said source; a transistor circuit, including a low impedance base input terminal, for comparing a pair of signals and for selectively actuating said switching device in response to the relative levels thereof; means for applying said feedback signal to the comparing circuit; and an emitter-follower transistor amplifier connecting the reference signal from said network to said base input terminal of said comparing circuit whereby said switching device is selectively actuated to maintain the angular velocity of said driven member substantially equal to said preselected angular velocity as represented by said reference signal and accelerations of said driven member in response to changes in the preselected angular velocity are controlled as a damped function of the setting of said adjustable source.

5. A control according to claim 4 including diode switching means for selectively actuating alternate portions of said resistance-capacitance network so as to provide different time constants for positive and negative accelerations in response to corresponding changes in the adjustment of said source.

6. In a controlled-velocity drive having a driven member, an electromagnetic coupling provided with a control winding, and a solid-state switching device for selectively controlling the energization of said winding thereby to regulate the angular velocity of said driven member; a control for said switching device comprising: a feedback circuit sensing the angular velocity of said driven member and producing a feedback signal which varies as a function thereof; an adjustable source for producing a voltage analog of a preselected angular velocity of said driven member; a resistor and a capacitor serially connected across said voltage source; a transistor triggering circuit, having a summing junction at the base terminal of a transistor therein, for selectively actuating said switching device in response to the algebraic sum of the signals applied to said junction; means for applying said feedback signal to said summing junction; and an emitter-follower transistor amplifier connecting the junction between said resistor and said capacitor to said summing junction whereby said switching device is selectively actuated to maintain the angular velocity of said driven member substantially equal to said preselected angular velocity as represented by said reference signal and accelerations of said driven member in response to changes in the preselected angular velocity are controlled as a damped function of the setting of said adjustable source.

7. In a controlled-velocity drive having a driven member, an electromagnetic coupling provided with a control winding, and a solid-state switching device for selectively controlling the energization of said winding thereby to regulate the angular velotiy of said driven member; a control for said swtiching device comprising: a feedback circuit sensing the angular velocity of said driven member and producing a feedback signal which varies as a function thereof; an adjustable source for producing a voltage analog of a preselected angular velocity of said driven member; a capacitor; a pair of resistors for connecting said capacitor to said source; a diode in series with each of said resistors, said diodes being oppositely polarized whereby one resistor is operative during positive acceleration and the other resistor is operative during negative acceleration in response to corresponding changes in the adjustment of said source; a transistor triggering circuit, having a summing junctiion at the base terminal of a transistor therein, for selectively actuating said switching device in response to the algebraic sum of the signals applied to said junction; means for applying said feedback signal to said summing junction; and an emitter-follower transistor amplifier for applying the damped reference signal available at said capacitor to said summing junction whereby accelerations of said driven member in response to changes in the preselected angular velocity are controlled as a damped function of the setting of said adjustable source.

References Cited

UNITED STATES PATENTS 3,187,243    6/1965    Long _____ 318—6
3,201,624    8/1965    Wilkerson _____ 310—95

DAVID X. SLINEY, *Primary Examiner.*